United States Patent
Nakashima et al.

(10) Patent No.: US 9,730,221 B2
(45) Date of Patent: *Aug. 8, 2017

(54) RADIO COMMUNICATION SYSTEM, BASE STATION DEVICE, MOBILE STATION DEVICE, AND RANDOM ACCESS METHOD

(71) Applicant: SHARP KABUSHIKI KAISHA, Osaka-shi, Osaka (JP)

(72) Inventors: Daiichiro Nakashima, Osaka (JP); Shohei Yamada, Osaka (JP); Yasuyuki Kato, Osaka (JP); Yasuo Sugawara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,068

(22) Filed: Apr. 23, 2014

(65) Prior Publication Data

US 2014/0233492 A1 Aug. 21, 2014

Related U.S. Application Data

(63) Continuation of application No. 13/730,220, filed on Dec. 28, 2012, now Pat. No. 8,743,821, which is a
(Continued)

(30) Foreign Application Priority Data

Sep. 18, 2007 (JP) .................................. 2007-241033

(51) Int. Cl.
*H04W 4/00* (2009.01)
*H04W 72/04* (2009.01)
(Continued)

(52) U.S. Cl.
CPC ....... *H04W 72/0453* (2013.01); *H04L 5/0053* (2013.01); *H04W 72/12* (2013.01); *H04W 74/0833* (2013.01); *H04W 74/0866* (2013.01)

(58) Field of Classification Search
CPC H04L 5/0053; H04W 72/0453; H04W 72/12; H04W 74/0833; H04W 74/0866
(Continued)

(56) References Cited

U.S. PATENT DOCUMENTS 7,218,950 B2  5/2007  Qiu et al.
7,809,373 B2  10/2010 Park et al.
(Continued)

FOREIGN PATENT DOCUMENTS

| CN | 101690380 A | 3/2010 |
|---|---|---|
| JP | 2001-204086 A | 7/2001 |
| JP | 2002-522994 A | 7/2002 |

OTHER PUBLICATIONS

3GPP TS 36.211, "3rd Generation Partnership Project; Technical Specification Group Radio Access Network; Physical Channels and Modulation (Release 8)," V1.0.3, May 2007, 34 pages.
(Continued)

*Primary Examiner* — Khaled Kassim
*Assistant Examiner* — Berhanu Belete
(74) *Attorney, Agent, or Firm* — Birch, Stewart, Kolasch & Birch, LLP

(57) ABSTRACT

A mobile station (MS) performs a first random access procedure using a dedicated preamble for non-contention based random access on a first available random access channel (RACH) of a plurality of RACHs in time domain within a period that the dedicated preamble is valid. In addition, the MS performs a second random access procedure using the dedicated preamble for non-contention based random access on the first available RACH after the prede-
(Continued)

termined time window has expired in a case that a random access response to the transmitted preamble is not received within a predetermined time window monitoring for the random access response. The MS also transmits the dedicated preamble on a RACH allowed to transmit by the BS, where any one of the RACHs in frequency domain is allowed to be transmitted by the BS over a period of time that the plurality of RACHs are allocated to a single carrier.

2 Claims, 11 Drawing Sheets

Related U.S. Application Data continuation of application No. 12/678,430, filed as application No. PCT/JP2008/066734 on Sep. 17, 2008, now Pat. No. 8,369,269.

(51) Int. Cl.
  *H04W 72/12* (2009.01)
  *H04L 5/00* (2006.01)
  *H04W 74/08* (2009.01)

(58) Field of Classification Search
  USPC .......................................................... 370/329
  See application file for complete search history.

(56) References Cited

U.S. PATENT DOCUMENTS

| | | | |
|---|---|---|---|
| 8,190,098 B2 | 5/2012 | Hus et al. | |
| 8,310,919 B2* | 11/2012 | Worrall | H04W 72/005 370/229 |
| 8,509,164 B2 | 8/2013 | Park et al. | |
| 2004/0204101 A1 | 10/2004 | Qiu et al. | |
| 2007/0081484 A1 | 4/2007 | Wang | |
| 2007/0211671 A1 | 9/2007 | Cha | |
| 2007/0230600 A1* | 10/2007 | Bertrand | H04J 13/00 375/260 |
| 2007/0254656 A1* | 11/2007 | Dalsgaard | H04B 7/2681 455/435.1 |
| 2008/0192766 A1* | 8/2008 | Ranta-Aho | H04W 74/004 370/445 |
| 2008/0232329 A1* | 9/2008 | Jen | H04W 74/002 370/335 |
| 2008/0233941 A1* | 9/2008 | Jen | H04W 74/002 455/418 |
| 2008/0267126 A1* | 10/2008 | Vujcic | H04B 7/2637 370/330 |
| 2008/0273482 A1* | 11/2008 | Lee et al. | 370/312 |
| 2008/0318578 A1 | 12/2008 | Worrall | |
| 2009/0046641 A1* | 2/2009 | Wang | H04W 74/002 370/329 |
| 2009/0323607 A1 | 12/2009 | Park et al. | |
| 2010/0080194 A1 | 4/2010 | Kawasaki et al. | |
| 2010/0172299 A1* | 7/2010 | Fischer | H04W 74/0866 370/328 |
| 2010/0202402 A1* | 8/2010 | Dalsgaard | H04W 36/0055 370/331 |
| 2010/0226263 A1* | 9/2010 | Chun et al. | 370/252 |
| 2011/0080889 A1 | 4/2011 | Kanterakis | |
| 2011/0292816 A1 | 12/2011 | Lee et al. | |

OTHER PUBLICATIONS

3GPP TS 36.300 V8.10. (Jun. 2007), "3rd Generation Partnership Project . . . Evolved Universal Terrestrial Radio Access (E-UTRA) and Evolved Universal Terrestrial Radio Access Network (E-UTRAN); Overall description; Stage 2 (Release 8)", No. V8.1.0, pp. 1-106, Jun. 1, 2007.
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," V8.0.0, Mar. 2007, pp. 1-82.
Arzelier, 3GPP TSG-RAN WG2 Meeting #58, "Draft minutes of the 58bis TSG-RAN WG2 meeting," Jun. 25-29, 2007, Orlando, USA, pp. 1-121.
Ericsson, "Initial Random Access and Identity Handling", TSG-RAN WG2 Meeting #51, Feb. 9, 2006, R2-060592, 7 pages.
Ericsson, 3GPP TSG-RAN WG2 Meeting #59, R2-073238, "On the details of the dedicated preamble at intra-LTE handover," Athens, Greece, Aug. 20-24, 2007, pp. 1-3.
LG Electronics, Samsung, 3GPP TSG-RAN WG2 #57bis, "Use of dedicated RACH signatures," R2-071455, St. Julian's, Malta, Mar. 26-30, 2007, pp. 1-4.
Motorola, "Contention and Contention-Free Intra-LTE Handovers", 3GPP TSG-RAN WG2 #56bis, Jan. 12, 2007, R2-070214, pp. 1-3.
Nokia Siemens Networks, 3GPP TSG-RAN2 Meeting #58, R2-072338, 36.300 CR0002 rev, "Update on Mobility, Security, Random Access Procedure, etc . . . ," Kobe, Japan, May 7-11, 2007, 45 pages.
Panasonic, 3GPP TSG RAN WG2 #57, "Random Access Preamble Signatures Usage," R2-070524, Feb. 12-16, 2007, 4 pages.
Samsung, 3GPP TSG-RAN2 Meeting #59, "Recap of handover procedure, control plane aspects (with TP)," R2-073704, Athens, Greece, Aug. 20-24, 2007, pp. 1-8.
U.S. Notice of Allowance issued in U.S. Appl. No. 12/678,430 on Oct. 1, 2012.
U.S. Notice of Allowance issued in U.S. Appl. No. 13/730,220 on Jan. 21, 2014.
U.S. Office Action issued in U.S. Appl. No. 12/678,430 on Apr. 24, 2012.
U.S. Office Action issued in U.S. Appl. No. 13/730,220 on Jun. 19, 2013.

\* cited by examiner

FIG. 3

| NEIGHBOR-CELL RADIO CHANNEL QUALITY INFORMATION Q | ASSIGNMENT PERIOD T |
|---|---|
| $Q \geq Q0$ | T0 |
| $Q0 > Q \geq Q1$ | T1 |
| $Q1 > Q \geq Q2$ | T2 |
| $Q2 > Q$ | T3 |

FIG. 6A

| EXTENDED ASSIGNMENT PERIOD | PREAMBLE NUMBER |

FIG. 6B

| EXPANSION IDENTIFIER | PREAMBLE NUMBER |

RADIO COMMUNICATION SYSTEM, BASE STATION DEVICE, MOBILE STATION DEVICE, AND RANDOM ACCESS METHOD

This application is a Continuation of U.S. application Ser. No. 13/730,220, filed on Dec. 28, 2012, which is a Continuation of U.S. application Ser. No. 12/678,430, filed on Mar. 16, 2010, which is the national stage of PCT/JP2008/066734 filed Sep. 17, 2008. Priority is claimed on Japanese Patent Application No. 2007-241033, filed Sep. 18, 2007, the content of which is incorporated herein by reference.

TECHNICAL FIELD

The present invention relates to a radio communication system, a base station device, a mobile station device, and a random access method. Particularly, the present invention relates to a radio communication system, a base station device, a mobile station device, and a random access method for a mobile station device to perform non-contention based random access using a preamble having a preamble number assigned to the mobile station device.

BACKGROUND

W-CDMA (Wideband Code Division Multiple Access, i.e., the third generation mobile communication system cosponsored by Japan and Europe) has been standardized as a third generation cellular mobile communication scheme by 3GPP (3rd Generation Partnership Project), and cellular mobile communication services using W-CDMA have been sequentially provided. Further, evolved universal terrestrial radio access (hereinafter, "E-UTRA") and an evolved universal terrestrial radio access network have been considered by 3GPP.

OFDM (Orthogonal Frequency Division Multiplexing) has been proposed as an E-UTRA downlink. Additionally, DFT (Discrete Fourier Transform)-spread OFDM, which is a single-carrier communication scheme, has been proposed as an E-UTRA uplink.

FIG. 9 schematically illustrates an E-UTRA channel structure. An E-UTRA downlink includes a downlink pilot channel, a downlink synchronization channel, a broadcast channel, a downlink control channel, and a downlink shared channel.

An E-UTRA uplink includes an uplink pilot channel, a random access channel, an uplink control channel, and an uplink shared channel.

FIG. 10 illustrates an allocation example of the random access channel, the uplink shared channel, and the uplink control channel, which are included in an uplink frame. The uplink pilot channel is allocated using time-multiplexing in regions of the uplink shared channel and the uplink control channel. The horizontal and vertical axes shown in FIG. 10 denote time and frequency, respectively.

Each small square region shown in FIG. 10 is a time-and-frequency region called a resource unit. In this case, each resource unit is defined by 1.25 MHz in the frequency direction and 1 ms (i.e., 1 TTI (Transmit Time Interval)) in the time direction. The densely hatched region shown in FIG. 10 denotes the random access channel. The lightly hatched region denotes the uplink control channel. The other non-hatched region denotes the uplink shared channel.

Hereinafter, a structure of the random access channel for E-UTRA is schematically explained (see Non-Patent Document 1).

A cyclic prefix and a preamble are allocated in the uplink random access channel. The random access channel included in an uplink frame has a guard time length in the time region in consideration of the cyclic prefix length, the preamble length, and the synchronization timing shift, and has 72 subcarriers in the frequency region. A frame in which the random access channel is allocated is controlled by a base station device based on the number of mobile station devices included in a cell. For example, the random access channel is allocated not for every frame, but at a predetermined frame interval. Frequency allocation of random access channels in a frequency band of a radio communication system is also controlled by the base station device. Multiple random access channels can be allocated in the same frequency band.

On the other hand, resource allocation information concerning the downlink shared channel, a modulation scheme, an encoding rate, HARQ (Hybrid Automatic Repeat reQuest) information, MIMO (Multi-Input Multi-Output) information, a mobile station device identifier or a mobile-station-device group identifier (an identifier common to multiple mobile station devices), and the like are allocated in the downlink control channel included in a downlink frame. Information data, upper layer control information (Layer 3 (L3) message), the preamble number of a preamble, which is transmitted from a mobile station device by means of random access and detected by the base station device, and the like are allocated in the downlink shared channel. Regarding random access, the mobile-station-device group identifier included in the downlink control channel includes a random access identifier RA-RNTI (Random Access-Radio Network Temporary Identifier) indicating that a random access response is allocated in the downlink shared channel. The random access identifier RA-RNTI can be one-to-one correlated with each random access channel (see Non-Patent Document 2). In other words, random access channels having different frame positions are correlated to different RA-RNTIs. Further, random access channels having different frequency positions are correlated to different RA-RNTIs.

There are two types of random access channels having different parameters. Regarding one type of random access channels, 64 kinds of preambles are prepared for each cell. Regarding the other type of random access channels, 16 kinds of preambles are prepared for each cell. A preamble is generated based on a Zadoff-Chu sequence, and is correlated to information including a combination of information items, such as a random ID, a random access reason, pathloss/CQI (Channel Quality Information). For example, a total of 64 kinds of information items including a combination of 32 kinds of random IDs (5 bits) and two kinds of pathloss (1 bit) are correlated to a preamble. The pathloss information indicates whether pathloss of a signal that the mobile station device receives from the base station device is greater or smaller than a threshold. In this case, 32 kinds of preambles are selected from the 64 kinds of preambles based on the measured pathloss. Then, one kind of a preamble, which is to be actually transmitted by means of random access, is selected from the selected 32 kinds of preambles. Alternatively, the radio resource allocation size of a required uplink shared channel is selected based on the measured pathloss/CQI and a kind of information data to be transmitted, and then information including a combination of information concerning the radio resource allocation size and a random ID may be correlated to the preamble.

Hereinafter, a random access procedure (contention-based random access that will be explained later) for E-UTRA is schematically explained (see Non-Patent Document 3). FIG. 11 illustrates a sequence of the random access procedure between the base station device and the mobile station device. Four messages are exchanged between the base station device and the mobile station device.

The mobile station device selects one kind of a preamble from 64 or 16 kinds of preambles, and transmits the selected preamble to the base station device using the random access channel (message 1). The base station device detects the preamble transmitted from the mobile station device by performing correlation calculation between the signal received on the random access channel and a stored preamble, and detects a synchronization timing shift of the detected preamble. Then, the base station device transmits, as a random access response, data including uplink-and-downlink resource allocation information and a random access identifier RA-RNTI that is a random access response identifier to the mobile station device using the downlink control channel. Additionally, the base station device transmits data including the synchronization timing adjustment value, the preamble number of the detected preamble, and a mobile station device identifier C-RNTI (Cell-RNTI) that is unique in a cell to the mobile station device using the downlink shared channel (message 2).

The mobile station device extracts downlink resource allocation information from the downlink control channel including the random access identifier RA-RNTI that is the random access response identifier corresponding to the random access channel used by the mobile station device. Then, the mobile station device receives data on the downlink shared channel based on the downlink resource allocation information. Then, the mobile station device compares the preamble number included in the data received on the downlink shared channel to the preamble number of the preamble transmitted by the mobile station device. If those two preamble numbers are identical, the mobile station device determines that the random access has succeeded. If those two preamble numbers are not identical and if the same preamble number is not detected in the downlink control channel and the downlink shared channel, which are included in another frame within a predetermined time, the mobile station device determines that the random access has failed, and performs random access again. In other words, the mobile station device transmits a preamble, and then continues monitoring whether or not the preamble number corresponding to the transmitted preamble is received. Hereinafter, the predetermined time for determining that the random access has failed is called a "time window."

If it is determined that the random access has succeeded, the mobile station device transmits, to the base station device, data information (L3 message) and a mobile station device identifier IMSI (International Mobile Subscriber Identity) that is unique in the radio communication system, based on the received random access response, with use of the uplink resource allocated by the uplink resource allocation information, according to the synchronization timing adjustment value (message 3). The base station device having received the data information and the IMSI transmits data including at least the IMSI to the mobile station device in the downlink (message 4). The mobile station device receives the data in the downlink, confirms that the IMSI included in the data is the IMSI of the mobile station device, and thereby determines that the random access has completely succeeded. This operation is called contention resolution. Thus, initial communication between the base station device and the mobile station device is established.

Upon transmission of the message 1 in such random access, the mobile station device randomly selects a random ID. For this reason, if multiple mobile station devices select the same random ID and have the same pathloss, the generated preambles are identical. If each of the mobile station devices transmits the same preamble in the same timing on the random access channel corresponding to the same frequency position, the preambles collide with each other, and thereby the base station device cannot properly detect each preamble. In this case, the base station device does not transmit a random access response to the preamble not properly detected. Since a random access response is not transmitted, the mobile station device, which fails to detect, within the time window, a random access response to the preamble transmitted from the mobile station device, retransmits the preamble and continues retransmission on the random access channel until a random access response is detected, resulting in a delay until random access succeeds.

For the above reasons, a method has been proposed in which upon handover from base station device currently in communication to a different base station device, the base station device prepares a preamble dedicated for the handover (called "dedicated preamble") and assigns the dedicated preamble to the mobile station device performing the handover in order to maximally reduce a delay until establishment of communication and to reduce a time for disconnection of data communication (see Non-Patent Document 4). This is called non-contention based random access. The aforementioned random access using a preamble randomly selected by the mobile station device is called contention based random access.

Hereinafter, non-contention based random access is explained. FIG. 12 illustrates a sequence of a non-contention based random access procedure between the base station device and the mobile station device. When a channel quality of communication with the base station device degrades, the mobile station device searches a handover-destination base station device. When the handover-destination base station device is determined, the mobile station device communicates the determined information to the base station device currently in communication. The base station device receiving the determined information obtains handover preamble information from the handover-destination base station device targeted by the mobile station device. The handover preamble information includes at least the dedicated preamble number and further includes a dedicated-preamble assignment period, a use-permit start timing, and the like. The base station device in communication with the mobile station device transmits, to the mobile station device, a handover command that is control information for ordering a handover, and the handover preamble information received from the destination base station device targeted by the mobile station device (message 0).

Alternatively, the handover preamble information is communicated to the mobile station device by means of signaling, such as MAC (Medium Access Control signaling), RRC (Radio Resource Control signaling), or the like, which is different from the handover command.

The mobile station device having received the handover command selects a dedicated preamble based on the simultaneously received preamble information, and transmits the selected dedicated preamble to the destination base station device (message 1). The destination base station device having detected the dedicated preamble transmits a random access response including the synchronization timing adjustment value to the mobile station device (message 2). Thus, the mobile station device uses a dedicated preamble, thereby preventing a collision with another mobile station device, preventing a delay caused by the collision, and therefore enabling seamless communication.

[Non-Patent Document 1] 3GPP TS 36.211 V1.0.3 (2007-05), Physical Channels and Modulation (Release 8)

[Non-Patent Document 2] 3GPP TSG-RAN WG2 #58bis, 25-29 Jun. 2007, Orlando, USA "Draft0 minutes of the 58bis TSG-RAN WG2 meeting"

[Non-Patent Document 3] 3GPP TS 36.300 V8.0.0 (2007-03), Evolved Universal Terrestrial Radio Access (E-UTRA) and Evolved Universal Terrestrial Radio Access Network (E-UTRAN); Overall description; Stage 2 (Release 8)

[Non-Patent Document 4] 3GPP TSG-RAN2 #58, R2-072338, 7-11 May 2007, Kobe, Japan "36.300 CR0002 Update on Mobility, Security, Random Access Procedure, etc. . . . ."

DISCLOSURE OF THE INVENTION

Problems to be Solved by the Invention

Conventionally, an assignment valid period is set upon assignment of the dedicated preamble number, and the dedicated preamble number assigned to the mobile station device is valid only for the assignment period. However, if the mobile station deice cannot transmits the dedicated preamble, such as when the mobile station device fails to receive the dedicated preamble number assignment or is deviated from the coverage area of the base station device after receiving the dedicated preamble number assignment, the preamble number is occupied by the mobile station device until an expiration of the valid period. For this reason, if the valid period of the preamble number assignment is long, the preamble number cannot be assigned to another mobile station device, thereby causing a delay until the random access procedure is complete.

On the other hand, if the valid period of the preamble number assignment is short, the number of times the dedicated preamble can be retransmitted decreases. Consequently, the base station device cannot properly detect the dedicated preamble. For this reason, the procedure has to be retried from the dedicated preamble assignment, thereby causing a delay until a series of the random access procedures is complete.

The present invention is made in consideration of the above situation. The problem to be solved is to reduce a delay until the random access procedure using the dedicated preamble is complete.

Means for Solving the Problems

The present invention is made to solve the above problems. A radio communication system of the present invention includes: a base station device; and a plurality of mobile station devices each performing radio communication with the base station device. The base station device assigns random-access-signal identification information identifying a random access signal to each of the plurality of mobile station devices, and determines an assignment period for the random-access-signal identification information. Each of the plurality of mobile station devices occupies the random-access-signal identification information for the assignment period. Each of the plurality of mobile station devices transmits a random access signal corresponding to the random-access-signal identification information within the assignment period.

Accordingly, the radio communication system of the present invention assigns random-access-signal identification information for identifying a random access signal to the mobile station device. Additionally, the radio communication system determines an assignment period of the random-access-signal identification information for each random-access-signal identification information piece such that a longer assignment period is assigned as the possibility of random access retransmission is higher. For this reason, reassignment and unnecessary assignment of random-access-signal identification information are prevented. Therefore, random-access-signal identification information can be efficiently assigned, thereby suppressing a delay until the non-contention based random access procedure in which random access is performed based on the random-access-signal identification information assigned to the mobile station device is complete.

Regarding the above radio communication system, the base station device includes: a random-access-signal-identification-information determining unit that determines random-access-signal identification information to be assigned to the mobile station device; an assignment-period determining unit that determines an assignment period of the random-access-signal-identification information for each random-access-signal-identification information; a random access signal detector that detects a random access signal from a reception signal; a random access response generator that generates random access response information including the random-access-signal identification information corresponding to the detected random access signal; and a data controller that allocates, to a transmission signal, the random-access-signal identification information, information indicative of the assignment period, and the random access response information. The mobile station device includes: an assignment information receiver that receives the random-access-signal identification information and the information indicative of the assignment period corresponding to the random-access-signal identification information; a random access signal generator that receives the received random-access-signal identification information and generates a random access signal corresponding to the random-access-signal identification information; a transmitter that transmits the generated random access signal; a random access response receiver that receives the random access response information and extracts random-access-signal identification information included in the random access response information; and a retry processor that has the random access signal generator regenerate the random access signal corresponding to the random-access-signal identification information if the random access response receiver fails to receive a random access response including random-access-signal identification information corresponding to the transmitted random access signal and a predetermined time elapses after the random access signal corresponding to the random-access-signal identification information is transmitted, and if it is within the assignment period corresponding to the random-access-signal identification information indicated by the information received by the assignment information receiver.

Regarding the above radio communication system, the assignment-period determining unit determines the assignment period by selecting one of a plurality of predetermined assignment periods.

Regarding the above radio communication system, the assignment-period determining unit determines the assignment period based on a radio channel quality concerning the mobile station device.

Accordingly, the radio communication system of the present invention assigns random-access-signal identification information for identifying a random access signal to the mobile station device. Additionally, the radio communication system determines an assignment period of the random-access-signal identification information for each random-access-signal identification information piece such that a longer assignment period is assigned as the possibility of random access retransmission is higher. For this reason, reassignment and unnecessary assignment of random-access-signal identification information are prevented. Therefore, random-access-signal identification information can be efficiently assigned, thereby suppressing a delay until the non-contention based random access procedure in which random access is performed based on the random-access-signal identification information assigned to the mobile station device is complete.

Regarding the above radio communication system, the assignment-period determining unit determines the assignment period such that the assignment period is shorter as the radio channel quality concerning the mobile station device is better.

Accordingly, the radio communication system of the present invention assigns random-access-signal identification information for identifying a random access signal to the mobile station device. Additionally, the radio communication system determines an assignment period of the random-access-signal identification information for each random-access-signal identification information piece such that a shorter assignment period is assigned as the radio channel quality is better. Consequently, the assignment period becomes longer when the possibility of random access retransmission is high due to a bad radio channel quality, thereby preventing reassignment of random-access-signal identification information. When the possibility of random access retransmission is low due to a good radio channel quality, unnecessary assignment of random-access-signal identification information, such as when the mobile station device moves outside the communication coverage area, can be prevented. Therefore, random-access-signal identification information can be efficiently assigned, thereby suppressing a delay until the non-contention based random access procedure in which random access is performed based on the random-access-signal identification information assigned to the mobile station device is complete.

Regarding any one of the above radio communication systems, the assignment information receiver of the mobile station device receives the random-access-signal identification information and the information indicative of the assignment period from the base station device that is a handover source. The random access response receiver of the mobile station device receives the random access response information from the base station device that is a handover destination. The transmitter of the mobile station device transmits the random access signal to the base station device that is the handover destination. The assignment-period determining unit of the base station device determines the assignment period based on a radio channel quality between the base station device that is the handover destination and the mobile station device.

Regarding any one of the above radio communication systems, the base station device includes: an assignment-period extension instructor that generates assignment-period extension information for ordering extension of the assignment period of the random-access-signal identification information if the assignment period corresponding to the random-access-signal identification information elapses after the random access signal is firstly transmitted, without receiving the random access response including the random-access-signal identification information corresponding to the transmitted random access signal. The data controller of the base station device allocates, to the transmission signal, the assignment-period extension information to be transmitted with the random-access-signal identification information.

Accordingly, the radio communication system of the present invention has no need to perform reassignment of random-access-signal identification information to the mobile station device even if the assignment period of the random-access-signal identification information expires without a success of the random access. For this reason, a delay until the non-contention based random access procedure, in which random access is performed based on the random-access-signal identification information assigned to the mobile station device is complete, can be suppressed.

Regarding the above radio communication system, the data controller of the base station device allocates, to the transmission signal, an expansion random access identifier in lieu of a random access identifier indicating that the random access response is allocated to the transmission signal, as the assignment-period extension information.

Regarding the above radio communication system, the random-access-signal identification information is occupied in a particular random access channel by the mobile station device assigned the random-access-signal identification information. The expansion random access identifier is a value corresponding to the random access channel in which the mobile station device to which the assignment period extension information indicated by the expansion random access identifier is addressed occupies the random-access-signal identification information.

Accordingly, the radio communication system of the present invention can simultaneously assign the same random-access-signal identification information to multiple mobile station devices. Therefore, a case can be prevented where the mobile station device cannot perform non-contention based random access using the random-access-signal identification information assigned to the mobile station device since the same random-access-signal identification information is assigned to another mobile station device, thereby suppressing a delay until the non-contention based random access procedure is complete.

Regarding the above radio communication system, the random-access-signal identification information is occupied in a particular random access channel by each of the plurality of mobile station devices assigned the random-access-signal identification information.

A base station device of the present invention performs radio communication with a plurality of mobile station devices. The base station device assigns random-access-signal identification information identifying a random access signal to each of the plurality of the mobile station devices, and determines an assignment period for the random-access-signal identification information, each of the plurality of mobile station devices occupying the random-access-signal identification information for the assignment period.

A mobile station device of the present invention performs radio communication with a base station device that assigns random-access-signal identification information identifying a random access signal to the mobile station device, and determines an assignment period of the random-access-signal identification information. The mobile station device occupies the random-access-signal identification information for the assignment period. The mobile station device transmits a random access signal corresponding to the random-access-signal identification information within the assignment period.

A random access method of the present invention is provided for a radio communication system comprising a base station device and a plurality of mobile station devices each performing radio communication with the base station device. The random access method includes: a first step of the base station device assigning random-access-signal identification information identifying a random access signal to each of the plurality of the mobile station devices, and determining an assignment period for the random-access-signal identification information, each of the plurality of mobile station devices occupying the random-access-signal identification information for the assignment period; and a second step of each of the plurality of mobile station devices transmitting a random access signal corresponding to the random-access-signal identification information within the assignment period.

Effects of the Invention

According to the present invention, random-access-signal identification information for identifying a random access signal is assigned to the mobile station device. Additionally, the radio communication system determines an assignment period of the random-access-signal identification information for each random-access-signal identification information piece. For this reason, reassignment and unnecessary assignment of random-access-signal identification information are prevented. Therefore, random-access-signal identification information can be efficiently assigned, thereby suppressing a delay until the non-contention based random access procedure in which random access is performed based on the random-access-signal identification information assigned to the mobile station device is complete.

BRIEF DESCRIPTION OF THE DRAWINGS

FIG. 3 illustrates an example relationship between radio channel quality information Q and an assignment period T;

FIG. 6A illustrates an example of an information format of a random access response including an assignment-period extension message according to a second embodiment of the present invention;

FIG. 6B illustrates another example of an information format of a random access response including an assignment-period extension message according to the second embodiment;

DESCRIPTION OF REFERENCE NUMERALS

Figure 1:
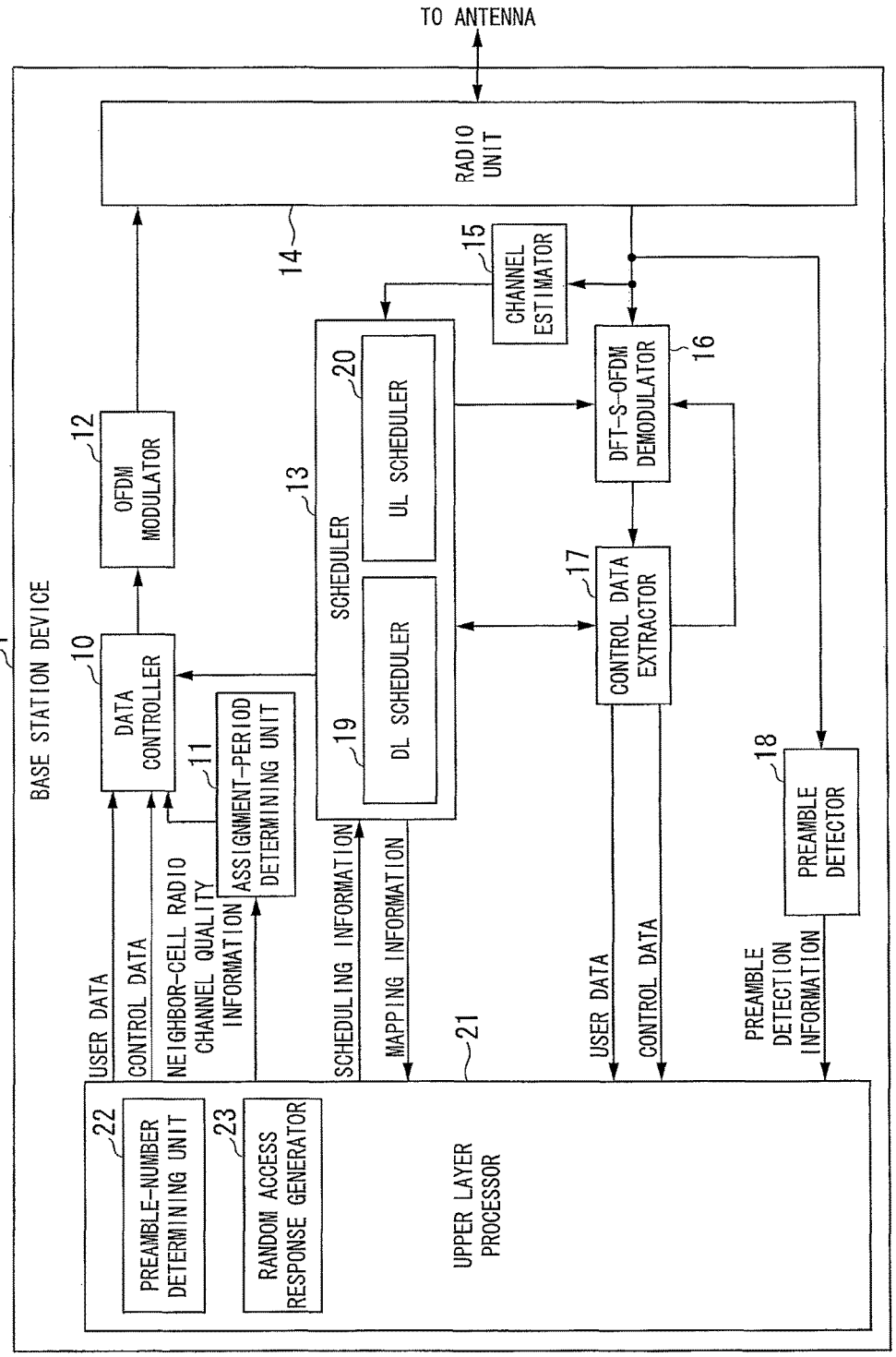
FIG. 1 is a schematic block diagram illustrating a configuration of the base station device 1 according to a first embodiment of the present invention.
Figure 2:
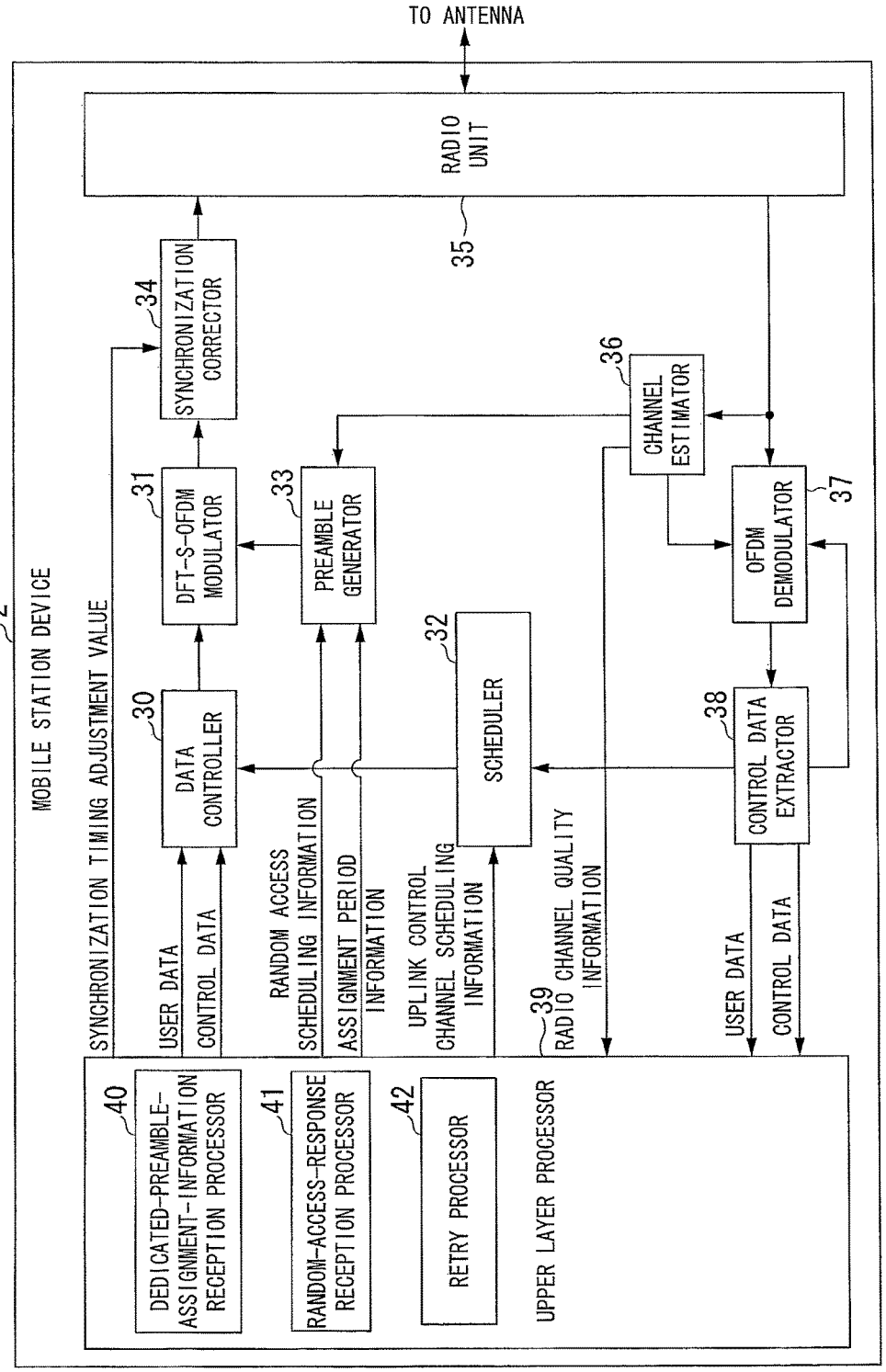
FIG. 2 is a schematic block diagram illustrating a configuration of a mobile station device 2 according to the first embodiment.

1 and 3 base station device
2 and 4 mobile station device
10 data controller
11 assignment-period determining unit
12 OFDM modulator
13 scheduler
14 radio unit
15 channel estimator
16 DFT-S-OFDM demodulator
17 control data extractor
18 preamble detector
19 DL scheduler
20 UL scheduler
21 and 24 upper layer processor
22 preamble-number determining unit
23 random access response generator
25 assignment-period extension instructor
30 data controller
31 DFT-S-OFDM modulator
32 scheduler
33 preamble generator
34 synchronization corrector
35 radio unit
36 channel estimator
37 OFDM demodulator
38 control data extractor
39 and 45 upper layer processor
40 dedicated-preamble-assignment-information reception processor
41 random-access-response reception processor
42 retry processor
44 assignment period extender
46 assignment-period-extension-information reception processor First Embodiment Hereinafter, a first embodiment of the present invention is explained with reference to accompanying drawings. In the first embodiment, non-contention based random access is performed, and an assignment period for the non-contention based random access is varied. FIG. 1 is a schematic block diagram illustrating a configuration of a base station device 1 according to a first embodiment of the present invention. FIG. 2 is a schematic block diagram illustrating a configuration of a mobile station device 2 according to the first embodiment. A radio communication system according to the first embodiment includes the base station device 1 shown in FIG. 1 and a plurality of the mobile station devices 2 shown in FIG. 2.

As shown in FIG. 1, the base station device 1 includes a data controller 10, an assignment-period determining unit 11, an OFDM modulator 12, a scheduler 13, a radio unit 14, a channel estimator 15, a DFT-S-OFDM demodulator 16, a control data extractor 17, a preamble detector 18, and an upper layer processor 21.

The data controller 10 receives control data and user data from the upper layer processor 21, and receives control data including dedicated-preamble assignment-period information from the assignment-period determining unit 11. Then, the data controller 10 maps the received control data and the user data to the downlink control channel and the downlink shared channel based on an instruction from the scheduler 13. Data mapped to the downlink control channel are resource allocation information for the downlink shared channel, resource allocation information for the uplink shared channel, a modulation scheme, an encoding rate, HARQ information, MIMO information, a mobile station device identifier or a mobile-station-device group identifier, and the like included in the control data.

Data mapped to the downlink shared channel are user data (information data regarding each mobile station device 2), upper layer control information included in the control data (the preamble number of a dedicated preamble to be assigned, and a dedicated-preamble assignment period) and the preamble number of a preamble (including a dedicated preamble) detected by the preamble detector 18 at the time of random access, a response identifier, a synchronization timing adjustment value, and the like. The data controller 10 maps these data items to the respective channels in different timings. The respective control data items to be transmitted in the downlink are processed by different communication layers. For this reason, the control data mapped to the downlink control channel is called L1/L2 control signaling. The control data mapped to the downlink shared channel is called L3 control signaling.

The assignment-period determining unit 11 receives neighbor-cell radio channel quality information concerning the mobile station device 2 from the upper layer processor 21, determines a dedicated-preamble assignment period, and outputs the determined assignment period to the data controller 10.

The OFDM modulator 12 performs, on the data mapped by the data controller 10 to the respective channels, OFDM modulation, such as data modulation, serial-to-parallel conversion, IFFT (Inverse Fast Fourier Transform), CP (Cyclic Prefix) insertion, and filtering, in order to generate an OFDM signal.

The scheduler 13 includes a DL scheduler 19 that performs downlink scheduling and an UL scheduler 20 that performs uplink scheduling. The DL scheduler 19 performs scheduling for allocating user data to the downlink shared channel based on CQI information received from the mobile station device 2 and scheduling information received from the upper layer processor 21. Additionally, the DL scheduler 19 controls a mapping to the downlink control channel, and outputs control information concerning mapping to the downlink shared channel and the downlink control channel to the data controller 10. Based on uplink radio channel estimation results and the scheduling information (required data service type, buffer status, and the like of the mobile station device 2) received from the channel estimator 15, the UL scheduler 20 performs scheduling for the mobile station device 2 to allocate user data to the uplink shared channel, and outputs control information (mapping information) concerning mapping to the uplink shared channel to the upper layer processor 21 and the DFT-S-OFDM demodulator 16.

The radio unit 14 upconverts the data converted by the OFDM modulator 12 into a radio frequency signal, and transmits the radio frequency signal to the mobile station device 2 through an antenna. Additionally, the radio unit 14 receives uplink data from the mobile station device 2 through the antenna, downconverts the received data into a baseband signal, and outputs the downconverted data to the channel estimator 15, the DFT-S-OFDM demodulator 16, and the preamble detector 18.

The channel estimator 15 estimates radio channel characteristics based on a reference signal transmitted in the uplink, and outputs the obtained radio channel estimation results to the DFT-S-OFDM demodulator 16 and the scheduler 13.

According to the radio channel estimation results received from the channel estimator 15, the DFT-S-OFDM demodulator 16 demodulates the reception data downconverted by the radio unit 14 based on the mapping information concerning the uplink shared channel, which is received from the UL scheduler 20.

The control data extractor 17 splits the reception data demodulated by the DFT-S-OFDM demodulator 16 into user data and control data. The control data includes CQI information, reception result information indicating whether the downlink shared channel is properly demodulated, i.e., ACK/NACK (Acknowledgement/Negative Acknowledgement) information, a scheduling request, and the like. The control data extractor 17 outputs the downlink CQI information included in the control data of the split data to the scheduler 13, and other control data and the user data to the upper layer processor 21. The ACK/NACK information is used for retransmission control. The scheduling request is used for the upper layer processor 21 to generate scheduling information.

The preamble detector (random access signal detector) 18 detects the preamble (random access signal) transmitted from the mobile station device 2 by performing correlation calculation between the reception data downconverted by the radio unit 14 and a stored preamble (including a dedicated preamble), and detects a synchronization timing shift amount of the detected preamble. Then, the preamble detector 18 reports, to the upper layer processor 21, preamble detection information including the preamble number (random-access-signal identification information) corresponding to the detected preamble and the detected synchronization timing shift amount.

The upper layer processor 21 calculates the resource size of the uplink shared channel to be allocated to the mobile station device, based on the pathloss information received from the mobile station device 2. Then, the upper layer processor 21 generates resource allocation information concerning the uplink shared channel according to the calculated resource size. The upper layer processor 21 outputs the generated resource allocation information concerning the uplink shared channel to the data controller 10 as control data. Then, the resource allocation information is transmitted to the mobile station device 2 using the downlink control channel according to the mapping performed by the scheduler 13. The upper layer processor 21 outputs the resource allocation information concerning the uplink shared channel to the scheduler 13 as scheduling information. Then, the scheduler 13 generates mapping information concerning the uplink shared channel based on the resource allocation information, and outputs the generated mapping information to the DFT-S-OFDM demodulator 16.

Additionally, the upper layer processor 21 includes a preamble-number determining unit 22 and a random access response generator 23. The preamble-number determining unit (random-access-signal-identification-information determining unit) 22 determines the preamble number of a dedicated preamble to be allocated to the mobile station device 2 from unused dedicated preambles when requesting non-contention based random access to the mobile station device 2, such as when the mobile station device 2 performs a handover. Then, the preamble-number determining unit 22 outputs the determined preamble number to the data controller 10 as control data. The random access response generator 23 calculates a synchronization timing adjustment value for the mobile station device 2 based on the synchronization timing shift amount received from the preamble detector 18. Further, the random access response generator 23 generates a random access response including the calculated synchronization timing adjustment value and the preamble number that is obtained from the preamble detector 18, and outputs the generated random access response to the data controller 10. The random access response is transmitted to the mobile station device 2 using the downlink shared channel based on the mapping performed by the scheduler 13.

As shown in FIG. 2, the mobile station device 2 includes a data controller 30, a DFT-S-OFDM modulator 31, a scheduler 32, a preamble generator 33, a synchronization corrector 34, a radio unit 35, a channel estimator 36, an OFDM demodulator 37, a control data extractor 38, and an upper layer processor 39. In the present embodiment, the data controller 30 and the DFT-S-OFDM modulator 31, and upconversion performed by the radio unit 35 function as a transmitter.

The data controller 30 receives control data and user data from the upper layer processor 39. According to an instruction from the scheduler 32, the data controller 30 maps the received control data to the uplink control channel or the uplink shared channel, and the received user data to the uplink shared channel, respectively. For example, the data controller 30 maps, as control data, neighbor-cell radio channel quality information to the uplink shared channel.

The DFT-S-OFDM modulator 31 performs, on the data mapped by the data controller 30 to the respective channels and a preamble (including a dedicated preamble) received from the preamble generator 33, DFT-S-OFDM modulation, such as data modulation, DFT (Discrete Fourier Transform), subcarrier mapping, IFFT, CP insertion, filtering, and transmission power control, in order to generate a DFT-S-OFDM signal.

The scheduler 32 performs scheduling for the data controller 30 to perform the aforementioned mapping based on the scheduling information concerning the uplink control channel received from the upper layer processor 39 and the resource allocation information concerning the uplink shared channel received from the control data extractor 38. Then, the scheduler 32 outputs control information concerning mapping to the uplink control channel and the uplink shared channel to the data controller 30. The scheduling information concerning the uplink control channel includes information concerning frame positions and frequency positions used for transmitting CQI information or ACK/NACK information on the uplink control channel.

The preamble generator (random access signal generator) 33 generates a preamble (including a dedicated preamble) based on the random access scheduling information and allocation period information that are received from the upper layer processor 39, and the pathloss information received from the channel estimator 36. Then, the preamble generator 33 outputs the generated preamble to the DFT-S-OFDM modulator 31. The random access scheduling information includes dedicated preamble information including the preamble number received from the destination base station device 1 through the base station device currently in communication, and information concerning frame positions and frequency positions to which random access channels are allocated, which are determined based on broadcast information received from the destination base station device 1 if a handover is performed. The preamble generator 33 recognizes that the dedicated preamble indicated by the random access scheduling information can be used only within the dedicated-preamble assignment period indicated by the assignment period information. As long as it is within the assignment period, the assigned dedicated preamble is repeatedly retransmitted again and again if a random access response is not received from the base station device 1. In this case, power ramping for increasing the transmission power by a constant amount for each retransmission is performed.

Upon establishment of communication with the base station device 1, such as power-on, the mobile station device 2 does not receive dedicated preamble information and the assignment period information, and performs contention based random access. For this reason, the preamble generator 33 selects a preamble based on randomly selected random ID and pathloss information, and generates a preamble with no time limitation. Upon establishment of communication with the handover-destination base station device, the mobile station device 2 receives dedicated preamble information and performs non-contention based random access. For this reason, the preamble generator 33 generates a dedicated preamble based on the received dedicated preamble information.

The synchronization corrector 34 adjusts transmission timing based on the synchronization timing adjustment value input from the upper layer processor 39, which is transmitted from the base station device 1. Then, the synchronization corrector 34 outputs the DFT-S-OFDM signal received from the DFT-S-OFDM modulator 31 to the radio unit 35.

The radio unit 35 upconverts the DFT-S-OFDM signal received through the synchronization corrector 34 into a radio frequency signal, and transmits the radio frequency signal to the base station device 1 through an antenna. Additionally, the radio unit 35 receives downlink data from the base station device 1 through the antenna, downconverts the received data into a baseband signal, and output the baseband signal to the channel estimator 36 and the OFDM demodulator 37.

The channel estimator 36 estimates radio channel characteristics based on a reference signal transmitted in the downlink. Based on the obtained radio channel characteristics, the channel estimator 36 generates radio channel quality information and calculates pathloss information. Then, the channel estimator 36 outputs the radio-channel-characteristics estimation results to the OFDM demodulator 37, outputs the radio channel quality information to the upper layer processor 39, and outputs the pathloss information to the preamble generator 33. The radio channel quality information is, for example, SNR (Signal to Noise Ratio) or SINR (Signal to Interference and Noise Ratio). Based on the radio channel quality information, the upper layer processor 39 of the mobile station device 2 generates CQI information (for example, information including a combination of a modulation scheme and an encoding rate) as radio channel quality information concerning a cell in currently communication. Additionally, the upper layer processor 39 generates RSRP (Reference Signal Received Power) information as neighbor-cell radio channel quality information.

The OFDM demodulator 37 demodulates the reception data downconverted by the radio unit 35 based on the radio-channel-characteristic estimation results received from the channel estimator 36. Specifically, the OFDM demodulator 37 demodulates data included in the downlink control channel, and then demodulates data included in the downlink shared channel based on the resource allocation information concerning the downlink shared channel.

Upon receiving the reception data demodulated by the OFDM demodulator 37, the control data extractor 38 extracts the resource allocation information concerning the downlink shared channel from the reception data on the downlink control channel including the mobile station device identifier of the mobile station device 2, and outputs the extracted resource allocation information to the OFDM demodulator 37. Further, the control data extractor 38 splits the reception data from the downlink control channel and the downlink shared channel into user data and control data. Then, the control data extractor 38 outputs, to the scheduler 32, uplink scheduling information, such as the resource allocation information concerning the uplink shared channel, which is included in the control data. Additionally, the control data extractor 38 outputs, to the upper layer processor 39, other control data and user data, such as the synchronization timing adjustment value. Upon receiving a random access response, the control data extractor 38 extracts resource allocation information in the downlink shared channel from the reception data in the downlink control channel, which includes a random access identifier RA-RNTI. Then, the control data extractor 38 outputs, as control data, the random access response (preamble number) included in the downlink shared channel indicated by the extracted resource allocation information to the upper layer processor 39.

The upper layer processor 39 includes a dedicated-preamble-assignment-information reception processor 40, a random-access-response reception processor 41, and a retry processor 42. The dedicated-preamble-assignment-information reception processor (assignment information receiver) 40 receives dedicated-preamble assignment information included in the control data the control data extractor 38 outputs to the upper layer processor 39, extracts the preamble number and information indicative of an assignment period corresponding to the preamble number from the received information, and outputs these information items to the preamble generator 33. The random-access-response reception processor (random access response receiver) 41 receives a random access response included in the control data the control data extractor 38 outputs to the upper layer processor 39. If the preamble number included in the random access response is identical to the preamble number of the dedicated preamble transmitted from the mobile station device 2, the random-access-response reception processor 41 recognizes that the random access has succeeded.

If a random access response corresponding to the preamble number of the dedicated preamble is not detected from when the dedicated preamble is transmitted on the random access channel to when the predetermined time window (predetermined time) passes, and if it is within the assignment period corresponding to the preamble number, the retry processor 42 controls the preamble generator 33 to regenerate the dedicated preamble corresponding to the preamble number and to output the regenerated dedicated preamble. Only if it is within the assignment period specified by the dedicated-preamble-assignment-information reception processor 40, the preamble generator 33 regenerates the dedicated preamble. If the period is expired, the preamble generator 33 does not regenerate the preamble. In the case of contention based random access, if the preamble number of the preamble transmitted from the mobile station device 2 is not detected within the time window, the retry processor 42 orders the preamble generator 33 to retry selection of a preamble and transmission of the selected preamble.

Hereinafter, an operation of the assignment-period determining unit 11 of the base station device 1 shown in FIG. 1 is explained. FIG. 3 illustrates an example relationship between neighbor-cell radio channel quality information Q reported from the mobile station device 2 and a dedicated-preamble assignment period T determined by the assignment-period determining unit 11.

For example, reference signal reception power RSRP is used as the neighbor-cell radio channel quality information. However, other information may be used. The assignment-period determining unit 11 of the base station device 1 determines the dedicated-preamble assignment period T based on a value of the neighbor-cell radio channel quality information Q at the time that the mobile station device 2 determines to perform a handover. If the neighbor-cell radio channel quality information Q is a predetermined threshold Q0 or greater, the assignment-period determining unit 11 assigns an assignment period T0 to the mobile station device 2. If the neighbor-cell radio channel quality information Q is a predetermined threshold Q1 or greater, and is smaller than the threshold Q0, the assignment-period determining unit 11 assigns an assignment period T1 to the mobile station device 2. If the neighbor-cell radio channel quality information Q is a predetermined threshold Q2 or greater, and is smaller than the threshold Q1, the assignment-period determining unit 11 assigns an assignment period T2 to the mobile station device 2. If the neighbor-cell radio channel quality information Q is smaller than a predetermined threshold Q2, the assignment-period determining unit 11 assigns an assignment period T3 to the mobile station device 2.

In FIG. 3, Q0>Q1>Q2 and T3>T2>T1>T0. The assignment-period determining unit 11 determines a dedicated-preamble assignment period based on the neighbor-cell radio channel quality received from the upper layer processor 39 such that a shorter assignment period is determined as the neighbor-cell radio channel quality information Q is greater (better).

Figure 4:
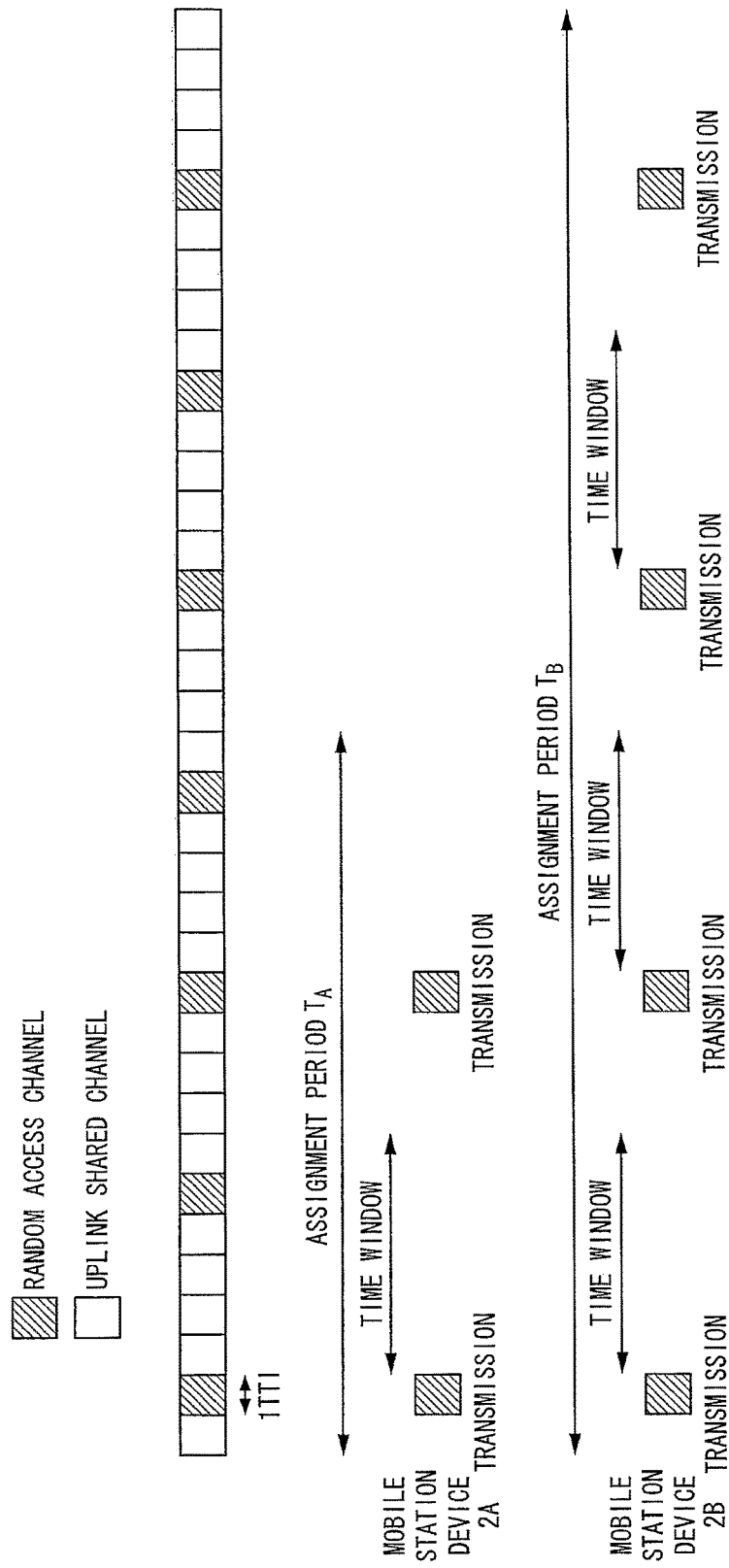
FIG. 4 illustrates a dedicated-preamble assignment period according to the first embodiment.

FIG. 4 illustrates an example of a dedicated-preamble assignment period according to the first embodiment. FIG. 4 illustrates the case where the random access channel is allocated at the 5 TTI interval, and the time window is 6 TTIs. For simplification of explanations, a frequency region is omitted in FIG. 4. As an assignment period $T_A$, 18 TTIs are assigned to the mobile station device 2A. As an assignment period $T_B$, 36 TTIs are assigned to the mobile station device 2B. If a dedicated preamble is transmitted on the first random access channel within the assignment period, the mobile station device 2A can transmit the dedicated preamble a total of two times including one time of retransmission within the assignment period $T_A$, while the mobile station device 2B can transmit the dedicated preamble a total of four times including three times of retransmission within the assignment period $T_B$.

If the radio channel quality for the mobile station device 2 included in the cell served by the base station device 1 gradually degrades, and therefore satisfactory communication services are difficult to be provided to the mobile station device 2, the base station device 1 basically handovers communication with the mobile station device 2 to another base station device 1 that serves a neighbor cell and provides the better radio channel quality, in order to maintain better communication services to the mobile station device 2. Basically, the mobile station device 2 firstly establishes communication with the base station device 1 providing the best radio channel quality so as to enhance the utilization efficiency of radio resources of the radio communication system. From a single point of view, the mobile station device 2 preferably communicates with the base station device 1 serving a cell achieving the best radio channel quality. However, it is not the best choice from a comprehensive point of view.

Load sharing has been proposed, in which in consideration of limited radio resources, a load of the base station device 1, and the like, an operator who is a communication service provider distributes traffic between the base station device 1 and the mobile station device 2 to each cell from a comprehensive point of view. Since the radio resources are limited, if the mobile station devices 2 are concentrated in a particular cell, the base station device 1 cannot allocate sufficient radio resources to all the mobile station device 2. For this reason, even if the mobile station device 2 having good radio channel quality cannot be provided satisfactory communication services. Additionally, if the mobile station devices 2 are concentrated in a particular cell, an extensively large amount of hardware load and software calculation for management and processing for communication with the mobile station devices 2 occurs, thereby burdening the operator. For this reason, communication with the mobile station devices 2 is controlled to be performed in a cell different from the cell in which the mobile station devices 2 are concentrated, in order to prevent the mobile station devices 2 from being concentrated in a particular cell. The base station device 1 having a heavy traffic due to the concentration of the mobile station devices 2 handovers the mobile station device 2 to a cell which has a light traffic and achieves the better radio channel quality, and in which the mobile station devices 2 are not concentrated.

Figure 5:
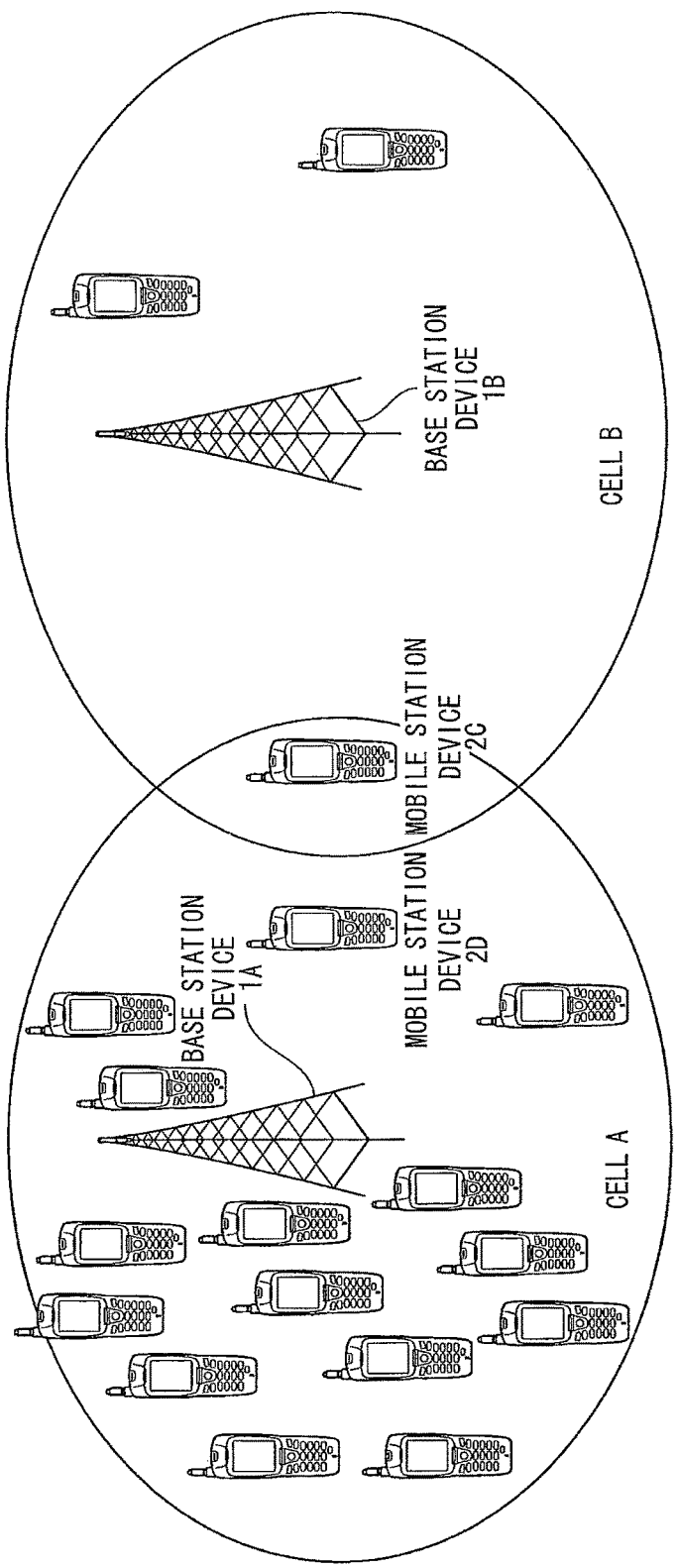
FIG. 5 illustrates a case of a mobile station device 2 according to the first embodiment having a different radio channel quality performing a handover.

FIG. 5 illustrates a case where the mobile station devices 2 each having different radio channel qualities perform a handover. In this case, not an instantaneous radio channel quality, but an average radio channel quality varying according to a distance between the base station device and the mobile station device is considered. The larger the distance is, the worse the radio channel quality is. The smaller the distance is, the better the radio channel quality is. FIG. 5 illustrates a case where a cell A served by the base station device 1A and a cell B served by the base station device 1B are present, and an extremely large number of the mobile station devices 2 are present in the cell A. A mobile station device 2C moving to a cell boundary of the cell A has a worse radio channel quality, and therefore handovers to the cell B achieving the better radio channel quality.

The handover is performed without consideration of load sharing. The cell A having a heavy traffic due to the concentration of an extremely large amount of the mobile station devices 2 tries to have the mobile station device 2 handover to the cell B having a less traffic.

For this reason, a mobile station device 2D having a better radio channel quality in the cell A than that in the cell B, while the radio channel quality in the cell B is not so bad, handovers to the cell B so as to distribute the concentration of the mobile station devices 2 and the traffic between the cells. Such a handover is performed in consideration of load sharing.

Thus, the mobile station device 2 having the different radio channel quality transmits a dedicated preamble as a handover procedure. The precision of the base station device 1 detecting the dedicated preamble transmitted from the mobile station device 2 having the different radio channel quality differs. For this reason, as the neighbor-cell radio channel quality degrades, a dedicated-preamble assignment period is set longer, the number of times dedicated-preamble can be retransmitted is set greater, and power ramping control for increasing transmission power for each retransmission is performed so that a dedicated preamble is detected within the assignment period. The upper layer processor 21 of the base station device 1 determines such a handover of the mobile station device 2 in consideration of load sharing, and outputs neighbor-cell radio channel quality information concerning the mobile station device 2 at the time of the determination to the assignment-period determining unit 11.

Other than the control of the dedicated-preamble assignment period based on the neighbor-cell radio channel quality, the assignment period may be controlled according to a purpose of assigning a dedicated preamble. Although it has been explained in the first embodiment that a dedicated preamble is assigned for a handover, it has also been considered that a dedicated preamble is assigned for the base station device 1 in communication to perform resynchronization with the mobile station device 2.

For example, when transmission and reception of signals are initiated again after a very long DRX (Discontinuous Reception) period for which transmission and reception of signals are not performed, the base station device 1 notifies the mobile station device 2 of the preamble number of a dedicated preamble as well as a synchronization request. The mobile station device 2 transmits the notified dedicated preamble to the base station device 1. The base station device 1 detects an uplink synchronization timing again based on the dedicated preamble received from the base station device 2, and transmits a synchronization timing adjustment value to the mobile station device 2. The synchronization request is a message for requesting an initiation of an uplink synchronization setting procedure.

If many signal errors frequently occur due to a synchronization loss between the base station device 1 and the mobile station device 2 caused by a setting miss of an uplink synchronization timer, the base station device 1 transmits the preamble number of a dedicated preamble as well as a synchronization request to the mobile station device 2. Upon establishment of communication, the base station device 1 and the mobile station device 2 perform uplink synchronization setting, and manage, using a timer, a period for maintaining a synchronized state based on the velocity of the mobile station device 2 or the like. If transmission and reception of signals are not performed in this period, it is determined that the synchronization is lost, and therefore the synchronization setting procedure is performed again. Even when the synchronization is lost due to a setting miss of the synchronization timer, however, transmission and reception of signals including information data are performed, resulting in an occurrence of many signal errors. For this reason, the synchronization setting is performed again when signal errors frequency occur.

In this case, the mobile station device 2 transmitting the dedicated preamble is one in communication in a cell (specifically, in the state where communication session is kept connected), and has a better radio channel quality than that of the mobile station device 2 performing a handover. Therefore, a possibility that the dedicated preamble will be detected by the base station device 1 is high. For this reason, an assignment period of a dedicated preamble transmitted for a synchronization request may be set to be shorter than that of a dedicated preamble transmitted for a handover.

Thus, as the radio channel quality is worse, an assignment period corresponding to the preamble number assigned to the mobile station device 2 having the radio channel quality is set to be longer. Consequently, when the radio channel quality is bad, and therefore a possibility of random access retransmission is high, a case where the random access procedure has to be performed again from assignment of the preamble number due to failure of random access can be prevented. Additionally, a delay until the random access procedure using a dedicated preamble is complete can be suppressed.

Further, as the radio channel quality is better, an assignment period corresponding to the preamble number assigned to the mobile station device 2 having the radio channel quality is set to be shorter. Consequently, when a possibility of random access retransmission is low thanks to the good radio channel quality, and when the mobile station device 2 fails to receive the dedicated preamble assignment, or the mobile station device 2 moves to an area outside the coverage of the base station device 1 and therefore becomes inaccessible, a case where the dedicated preamble is kept occupied by the mobile station device 2 and therefore cannot be assigned to another mobile station device 2 can be prevented. Additionally, a delay until the random access procedure using a dedicated preamble is complete can be suppressed.

Second Embodiment

A second embodiment of the present invention explains a radio communication system including a base station device 3 and multiple mobile station devices 4. The base station device 3 transmits an assignment-period extension message within a dedicated-preamble assignment period, and the mobile station device 4 receiving the assignment-period extension message extends the dedicated-preamble assignment period.

If the base station device 3 fails to detect a dedicated preamble transmitted from the mobile station device 4 assigned the dedicated preamble within a dedicated-preamble assignment period, the base station device 3 includes an assignment-period extension message into a random access response, and transmits the random access response. The mobile station device 4 assigned the dedicated preamble receives the random access response, reads the assignment-period extension message, extends the dedicated-preamble assignment period, and transmits the dedicated preamble within the extended assignment period.

Thus, the base station device 3, which preliminarily assumes that the dedicated preamble is to be transmitted from the mobile station device 4 within the assignment period, transmits the assignment-period extension message to the mobile station device 4. The mobile station device 4 receiving the message extends the dedicated-preamble assignment period right away so as not to perform the dedicated-preamble assignment procedure again, thereby suppressing a delay until the random access procedure is complete.

FIGS. 6A and 6B illustrate examples of information formats of random access responses each including the assignment-period extension message. The information format includes at least an assignment-period extension message and the preamble number. FIG. 6A shows an information format where an assignment-period extension message is formed by specifying an extended assignment period. The mobile station device 4 extends the dedicated-preamble assignment period corresponding to the specified preamble number by the specified period. FIG. 6B shows an information format where an extension identifier is used as the dedicated-preamble extension message. For example, the extension identifier is 1 bit of data. Predetermined assignment periods to be extended are preliminarily set to "1" and "0" of the extension identifier. The mobile station device extends the dedicated-preamble assignment period by the period corresponding to the extension identifier. Alternatively, the values of "1" and "0" of the extension identifier may indicate that the firstly-assigned dedicated-preamble assignment period is doubled or tripled.

Hereinafter, a detailed procedure, in which the base station device 3 transmits an assignment-period extension message, and the mobile station device 4 receiving the assignment-period extension message extends the dedicated-preamble assignment period, is explained.

The mobile station device 4 transmits a dedicated preamble using the random access channel. The base station device 3, which fails to detect the dedicated preamble within the dedicated-preamble assignment period, transmits an assignment-period extension message and the preamble number in lieu of a random access response using the downlink shared channel specified by the random access identifier RA-RNTI, which is transmitted on the downlink control channel and indicates that a random access response is allocated to the downlink shared channel. For simplification of explanations, a case where an extended assignment period is used as the assignment-period extension message is explained hereinafter.

The base station device 3 does not know on which random access channel the mobile station device 4 has transmitted the dedicated preamble. For this reason, the base station device 3 has a possibility of using all random access identifiers RA-RNTI without limiting a random access identifier RA-RNTI that is transmitted on the downlink control channel and indicates resource allocation of the downlink shared channel including the extended assignment period and the preamble number. The mobile station device 4 having transmitted the dedicated preamble monitors whether or not a random access identifier RA-RNTI is transmitted on the downlink control channel for all the random access identifiers RA-RNTI. The mobile station device 4 recognizes the preamble number of the assigned dedicated preamble and the extended assignment period, which are included in the downlink shared channel indicated by the resource allocation information concerning the downlink control channel including the random access identifier RA-RNTI. Then, the mobile station device 4 extends the dedicated-preamble assignment period by the extended assignment period.

Alternatively, instead of the assignment-period extension message being included in the downlink shared channel, expansion random access identifier (hereinafter "ERA-RNTI"), which is a dedicated mobile-station-device group identifier different from the random access identifier RA-RNTI, may be included in the downlink control channel so as to order the mobile station device 4 to extend the assignment period. The expansion random access identifier ERA-RNTI is a mobile station device group identifier common to the mobile station devices 4 assigned the dedicated preambles.

The base station device 3 includes the expansion random access identifier ERA-RNTI and the preamble number of the dedicated preamble into the downlink control channel and the downlink shared channel, respectively, and transmits those information items to the mobile station device 4 having failed to detect the dedicated preamble within the dedicated-preamble assignment period. On the other hand, the base station device 3 includes a random access identifier RA-RNTI corresponding to the random access channel in which the dedicated preamble is detected into the downlink control channel in a similar manner to one corresponding to the preamble used for contention based random access. Additionally, the base station device 4 includes the preamble number of the dedicated preamble into the downlink shared channel. Then, the base station device 4 transmits those information items to the mobile station device 4 having detected the dedicated preamble.

After the dedicated preamble is transmitted, the mobile station device 4 assigned the dedicated preamble monitors whether or not the expansion random access identifier ERA-RNTI is included for all the downlink control channels. Additionally, the mobile station device 4 monitors whether or not the random access identifier RA-RNTI corresponding to the random access channel used for transmission of the dedicated preamble for all the downlink control channels within the time window. If a downlink control channel including the ERA-RNTI is detected, the mobile station device 4 confirms whether or not the preamble number included in the downlink shared channel indicated by the resource allocation information included in the detected downlink control channel is the preamble number of the dedicated preamble assigned to the mobile station device 4. If the preamble number is the one of the dedicated preamble assigned to the mobile station device 4, the mobile station device 4 extends the dedicated-preamble assignment period. Regarding extension of the assignment period using the expansion random access identifier ERA-RNTI, a condition is preliminarily determined such that the mobile station device 4 extends the assignment period by the firstly-assigned assignment period or by a predetermined period.

If the mobile station device 4 detects the downlink control channel including the random access identifier RA-RNTI corresponding to the random access channel used for transmission, the mobile station device 4 confirms whether or not the preamble number included in the downlink shared channel indicated by the resource allocation information included in the detected downlink control channel is the preamble number of the dedicated preamble transmitted from the mobile station device 4. If the preamble number is the one of the dedicated preamble transmitted from the mobile station device 4, the mobile station device 4 recognizes that the random access has succeeded.

Figure 7:
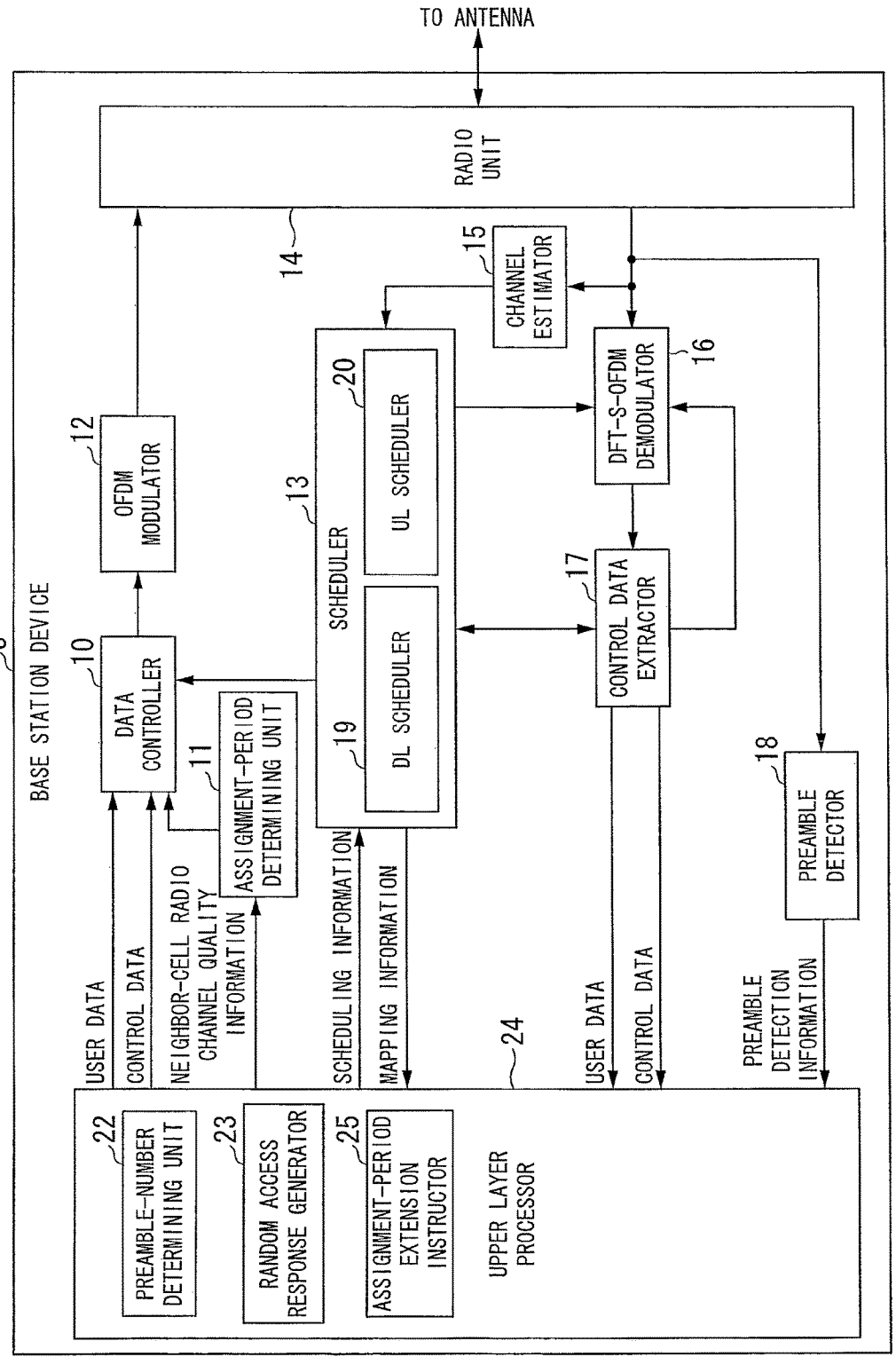
FIG. 7 is a schematic block diagram illustrating a configuration of a base station device 3 according to the second embodiment.

FIG. 7 is a schematic block diagram illustrating a configuration of the base station device 3. Like reference numeral (10-20, 22, and 23) denote like elements in FIGS. 1 and 7, and explanations thereof are omitted.

The difference from the base station device 1 shown in FIG. 1 is that the base station device 3 includes an upper layer processor 24 in lieu of the upper layer processor 21 and that the upper layer processor 24 includes an assignment-period extension instructor 25. If the assignment period determined by the assignment-period determining unit 11 has elapsed without the preamble detector 18 detecting the dedicated preamble corresponding to the preamble number determined by the preamble-number determining unit 22, the assignment-period extension instructor 25 generates the assignment-period extension message shown in FIG. 6A or 6B, and outputs assignment-period extension information including the assignment-period extension message and the corresponding preamble number to the data controller 10. If extension of the assignment period is specified using the expansion random access identifier ERA-RNTI, the assignment-period extension instructor 25 outputs, to the data controller 10, assignment-period extension information including the preamble number and the expansion random access identifier ERA-RNTI for specifying the downlink shared channel to which the preamble number is allocated.

Figure 8:
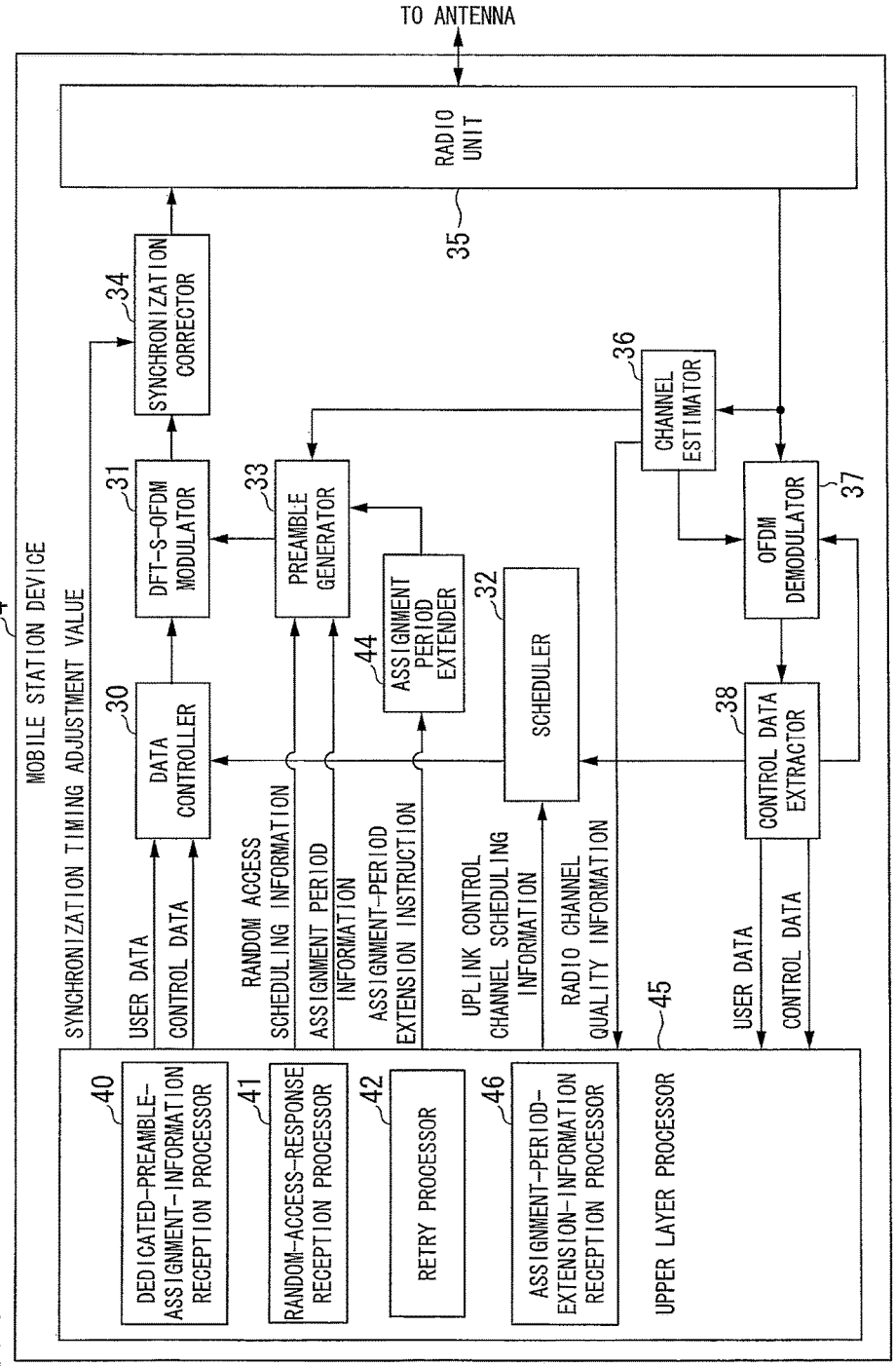
FIG. 8 is a schematic block diagram illustrating a configuration of a mobile station device 4 according to the second embodiment.
Figure 9:
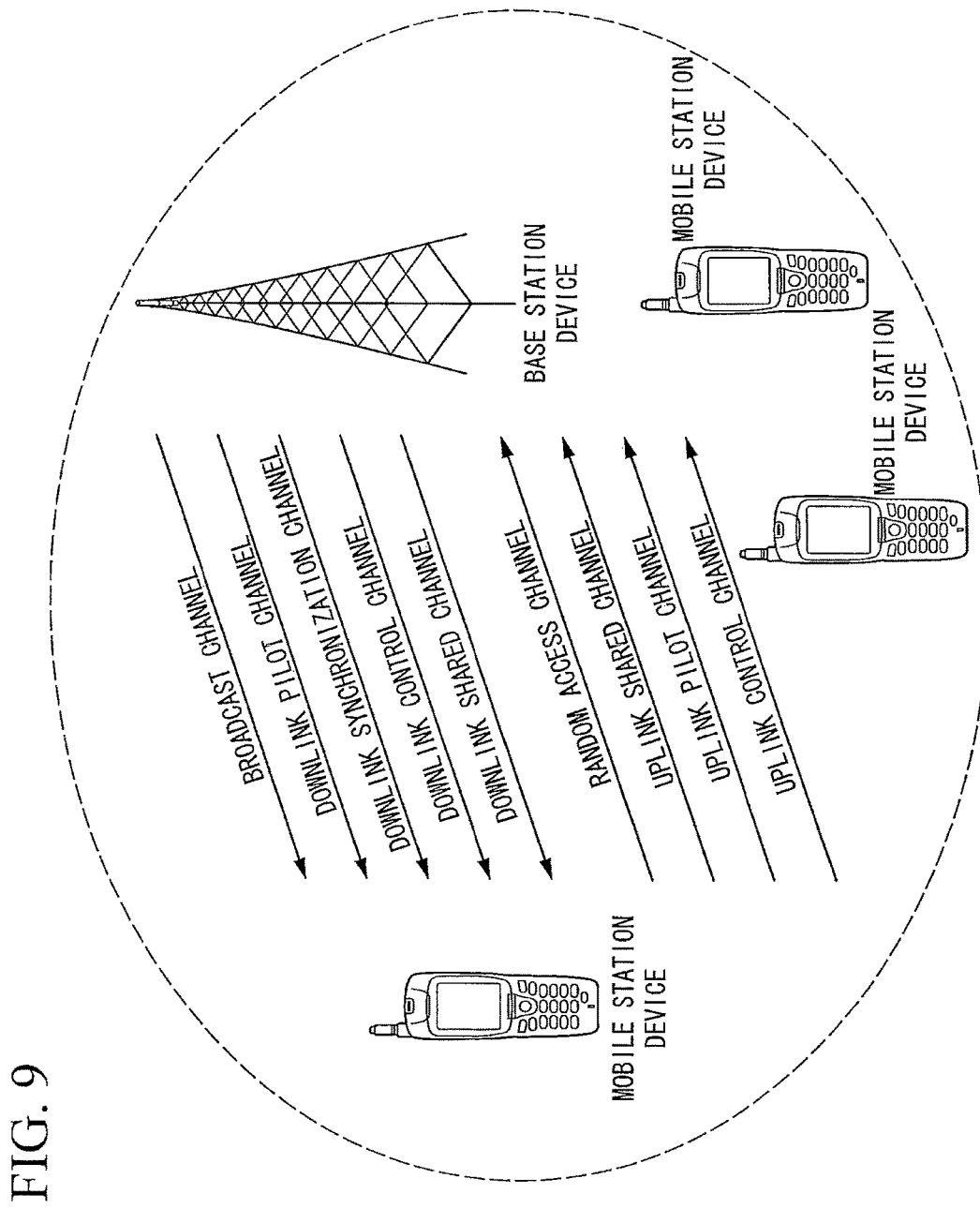
FIG. 9 schematically illustrates a channel structure for E-UTRA.
Figure 10:
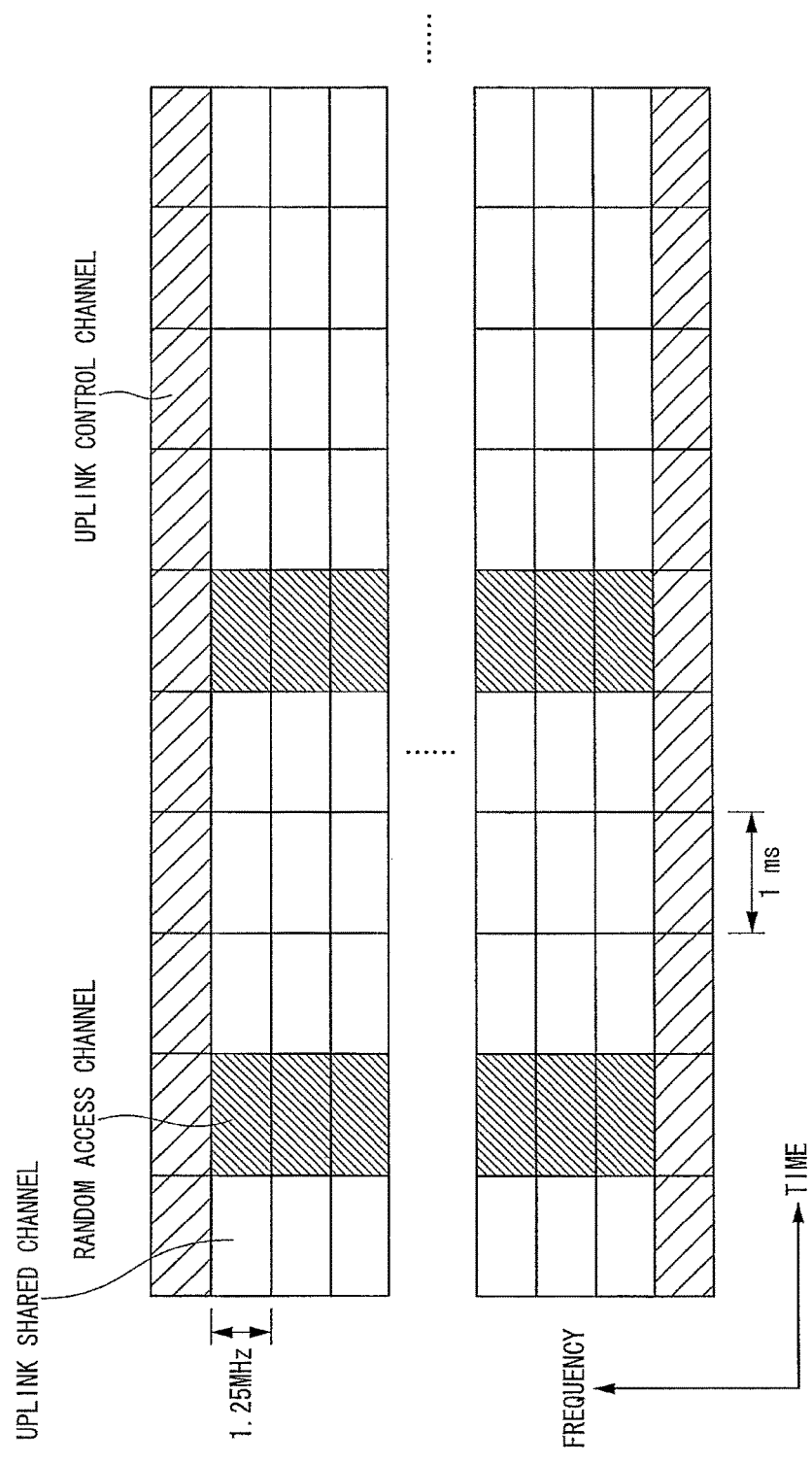
FIG. 10 illustrates an allocation example of random access channels, uplink shard channels, and uplink control channels, which are included in an uplink frame for E-UTRA.
Figure 11:
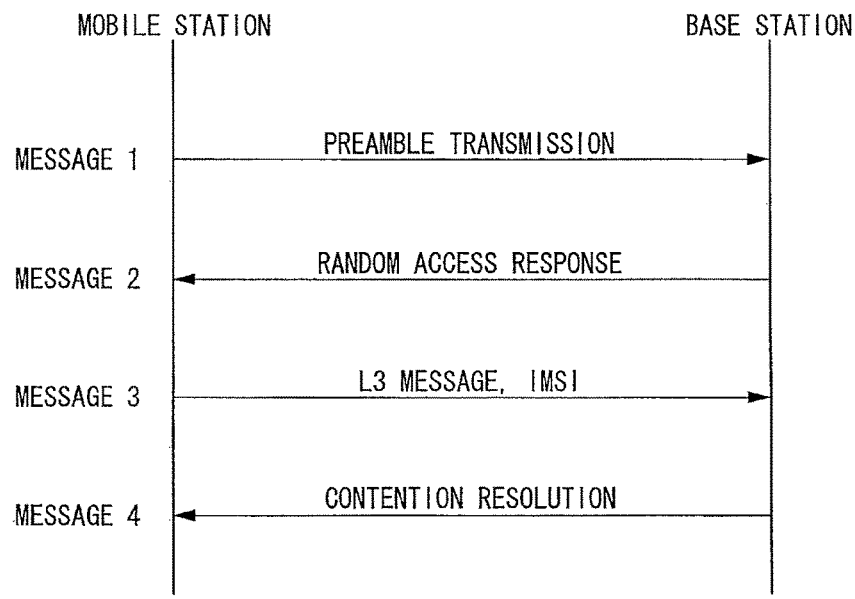
FIG. 11 illustrates a sequence of a random access procedure for E-UTRA between the base station device and the mobile station device.
Figure 12:
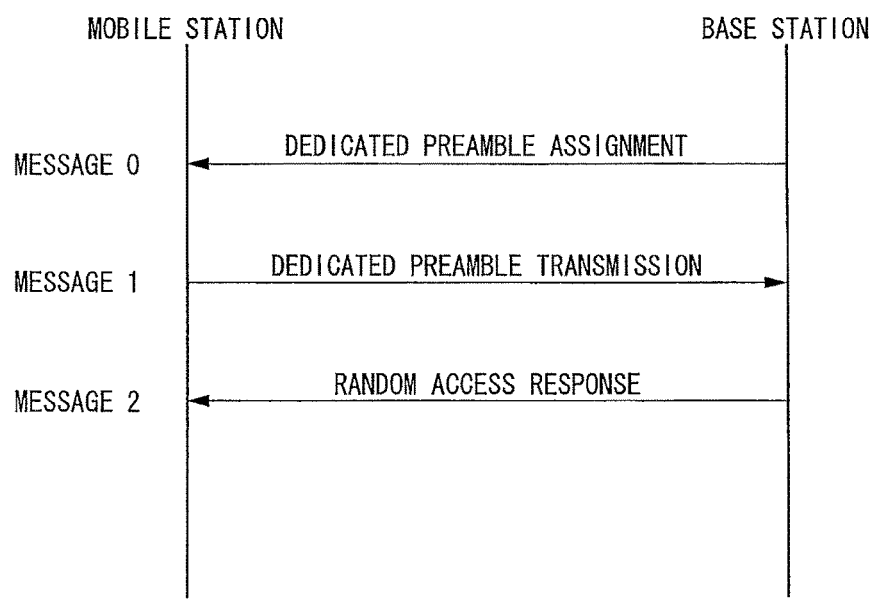
FIG. 12 illustrates a sequence of non-contention based random access for E-UTRA between the base station device and the mobile station device.

FIG. 8 is a schematic block diagram illustrating a configuration of the mobile station device 4. Like reference numerals (30-38 and 40-42) denote like elements in FIGS. 2 and 8, and explanations thereof are omitted here. The difference from the mobile station device 2 shown in FIG. 2 is that the mobile station device 4 includes an upper layer processor 45 in lieu of the upper layer processor 39, and that the upper layer processor 45 includes the assignment-period-extension-information reception processor 46, and the mobile station device 4 further includes an assignment period extender 44. The mobile station device 4 receives the extension message shown in FIG. 6A or 6B and the preamble number of the dedicated preamble assigned to the mobile station device 4, or the expansion random access identifier ERA-RNTI and the preamble number of the dedicated preamble assigned to the mobile station device 4. Then, the control data extractor 38 of the mobile station device 4 extracts these information items and outputs the extracted information items to the upper layer processor 45.

The assignment-period-extension-information reception processor 46 receives these information items output to the upper layer processor 45, and outputs the assignment-period extension instruction for ordering extension of the assignment period to the assignment period extender 44. In the case of the extension message shown in FIG. 6A, the assignment-period-extension-information reception processor 46 outputs an extended assignment period as the assignment-period extension instruction. Then, the assignment period extender 44 outputs control information for ordering extension of the assignment period by a period indicated by the extended assignment period to the preamble generator 33. In the case of the extension message shown in FIG. 6B, the assignment-period-extension-information reception processor 46 outputs an extension identifier as the assignment-period extension instruction. Then, the assignment period extender 44 outputs control information for ordering extension of the assignment period by a period indicated by the extension identifier to the preamble generator 33.

If the information received by the assignment-period-extension-information receiver 46 is the expansion random access identifier ERA-RNTI, the assignment-period-extension-information reception processor 46 outputs an extension order as an order of extending the assignment period. Additionally, the assignment period extender 44 outputs control information for ordering extension of the assignment period or control information for ordering extension of the assignment period by a predetermined period to the preamble generator 33.

By the above process, even if the dedicated preamble fails to be detected within the assignment period assigned with the dedicated preamble assignment, the dedicated-preamble assignment period is extended without performing the dedicated-preamble assignment procedure again. Accordingly, a random access processing time can be reduced, and therefore a time for establishing communication can be reduced.

Instead of generating the assignment-period extension message and transmitting the generated message to the mobile station device 4 after the dedicated-preamble assignment period elapses, the base station device 3 may transmit the generated message to the mobile station device 4 during the assignment period. For example, the base station device 3 can generate the assignment extension message and transmits the generated message to the mobile station device 4 in the timing close to the end of the assignment period so that a dedicated-preamble assignment period sequentially continues without an intermission.

When the base station device 3 allocates multiple random access channels in the same band, allocates a dedicate preamble corresponding to the same preamble number to multiple mobile station device 4, and allows the respective mobile station device 4 to perform transmission using only random access channels in different frequency bands, the expansion random access identifier ERA-RNTI or the random access identifier RA-RNTI is configured to be a mobile-station-device group identifier unique in each frequency band. For example, when two random access channels (random access channels 1 and 2) are allocated in the same band, two different expansion random access identifiers ERA-RNTIs (ERA-RNTI 1 and ERA-RNTI 2) are used.

The expansion random access identifier ERA-RNTI 1 is used for ordering the mobile station device 4 allowed to transmit a dedicated preamble using the random access channel 1 to extend the dedicated-preamble assignment period. The expansion random access identifier ERA-RNTI 2 is used for ordering the mobile station device 4 allowed to transmit a dedicated preamble using the random access channel 2 to extend the dedicated-preamble assignment period. Regarding monitoring of the expansion random access identifier ERA-RNTI performed by the mobile station device 4, the mobile station device 4 allowed to transmit a dedicated preamble using the random access channel 1 only monitors whether or not the downlink control channel includes the expansion random access identifier ERA-RNTI 1. The mobile station device 4, which is allowed to transmit the dedicated preamble using the random access channel 2, only monitors whether or not the downlink control channel includes the expansion random access identifier ERA-RNTI 2.

In this manner, even if the same preamble number is assigned to multiple mobile station devices 4 in the same time period, the respective mobile station devices 4 perform transmission using different random access channels. For this reason, the base station device 3 can detect those information pieces transmitted from the respective mobile station devices 4. Additionally, a value of the random access identifier RA-RNTI indicative of allocation of an assignment-period extension message, or a value of the expansion random access identifier ERA-RNTI for ordering extension of an assignment period is changed for each mobile station device 4. For this reason, each mobile station device 4 monitors the corresponding expansion random access identifier ERA-RNTI or the corresponding random access identifier RA-RNTI, and thus can obtain the order for extension of the assignment period assigned to the mobile station device 4.

Operations of: the data controller 10, the assignment-period determining unit 11, the OFDM modulator 12, the scheduler 13, the channel estimator 15, the DFT-S-OFDM demodulator 16, the control data extractor 17, the preamble detector 18, and the upper layer processor 21, which are shown in FIG. 1; the data controller 30, the DFT-S-OFDM modulator 31, the scheduler 32, the preamble generator 33, the synchronization corrector 34, the channel estimator 36, the OFDM demodulator 37, the control data extractor 38, and the upper layer processor 39, which are shown in FIG. 2; the data controller 10, the assignment-period determining unit 11, the OFDM modulator 12, the scheduler 13, the channel estimator 15, the DFT-S-OFDM demodulator 16, the control data extractor 17, the preamble detector 18, and the upper layer processor 24, which are shown in FIG. 7; and the data controller 30, the DFT-S-OFDM modulator 31, the scheduler 32, the preamble generator 33, the synchronization corrector 34, the channel estimator 36, the OFDM demodulator 37, the control data extractor 38, the assignment period extender 44, and the upper layer processor 45, which are shown in FIG. 8, may be implemented by storing a program for implementing the functions of the above units into a computer-readable recording medium, and by having a computer system read and execute the program stored in the recording medium. The "computer system" includes an OS and hardware, such as peripheral devices.

The "computer-readable recording medium" includes a portable medium, such as a flexible disk, an optical disc, an ROM, a CD-ROM, and the like, and a storage device such as a hard disk installed in a computer system. The "computer-readable recording medium" includes a medium dynamically storing a program for a short period, such as a communication line when a program is transmitted through a network such as the Internet or a communication line such as a telephone line. Additionally, the "computer-readable recording medium" includes a medium storing a program for a given period, such as volatile memory in a computer system of a server or a client in the above case. The program may be one for implementing a part of the aforementioned functions or one for implementing the aforementioned functions by combining another program stored in the computer system.

Although embodiments of the present invention have been explained with reference to the accompanying drawings, specific configurations are not limited thereto, and various modifications can be made without departing from the scope of the present invention.

INDUSTRIAL APPLICABILITY

The present invention is preferably used for a mobile radio communication system including a base station device and a mobile station device, but is not limited thereto.

The invention claimed is:
1. A mobile station device comprising:
a receiving circuit configured to receive, from a base station device, a message indicating a first time period for which a first dedicated preamble is valid, the first dedicated preamble being assigned by the base station device and used for the mobile station device to perform non-contention based random access; and
a transmitting circuit configured to transmit to the base station device, within the first time period, the first dedicated preamble on a first random access channel of a plurality of random access channels, wherein
in a case that a random access response to the transmitted first dedicated preamble is not received within a time window used for monitoring the random access response, the transmitting circuit is configured to retransmit the first dedicated preamble on the first random access channel after the time window has expired and before the first time period expires, the time window being shorter than the first time period,
the first random access channel is one of the plurality of random access channels selected by the base station device,
the plurality of random access channels in frequency domain are allocated to a single carrier, and the plurality of random access channels are allocated at a predetermined frame interval in time domain.

2. A base station device comprising:
a transmitting circuit configured to transmit, to a mobile station device, a message indicating a first time period for which a first dedicated preamble is valid, the first dedicated preamble being assigned by the base station device and used for the mobile station device to perform non-contention based random access;
a preamble detecting circuit configured to detect, after a time window has expired and before the first time period expires, the first dedicated preamble on a first random access channel of a plurality of random access channels, the time window being used for the mobile station device to monitor a random access response, and the time window being shorter than the first time period; and
an upper layer processing circuit configured to notify the mobile station device of the first random access channel, wherein
the first dedicated preamble has been initially transmitted within the first time period by the mobile station device on the first random access channel,
the first dedicated preamble has been retransmitted by the mobile station device on the first random access channel in a case that the preamble detecting circuit fails to detect the first dedicated preamble within the time window,
the plurality of random access channels in frequency domain are allocated to a single carrier, and
the plurality of random access channels are allocated at a predetermined frame interval in time domain.

* * * * *